United States Patent [19]

Koermer et al.

[11] Patent Number: 5,521,133
[45] Date of Patent: May 28, 1996

[54] PHOSPHORUS BOUND POROUS MICROSPHERES

[75] Inventors: Gerald S. Koermer, Roseland; John M. Macaoay, Linden, both of N.J.; Paul R. Suitch, Milledgeville, Ga.; Eric W. Stern, Mountainside, N.J.

[73] Assignee: Engelhard Corporation, Iselin, N.J.

[21] Appl. No.: 348,397

[22] Filed: Nov. 29, 1994

[51] Int. Cl.⁶ ..................................................... B01T 35/08
[52] U.S. Cl. ................................ 502/9; 502/68; 502/80; 502/81; 502/208
[58] Field of Search ................................ 502/9, 68, 80, 502/81, 208

[56] References Cited

U.S. PATENT DOCUMENTS

| | | | |
|---|---|---|---|
| 4,171,286 | 10/1979 | Dight et al. | 252/455 Z |
| 4,493,902 | 1/1985 | Brown et al. | 502/65 |
| 4,781,818 | 11/1988 | Reagan et al. | 208/251 R |
| 5,082,815 | 1/1992 | Macedo | 502/68 |
| 5,083,814 | 1/1992 | Guinta et al. | 283/70 |
| 5,190,902 | 3/1993 | Demmel | 502/63 |
| 5,194,412 | 3/1993 | Roberie et al. | 502/64 |
| 5,231,064 | 7/1993 | Absil et al. | 502/68 |
| 5,348,643 | 9/1994 | Absil et al. | 208/114 |
| 5,366,948 | 11/1994 | Absil et al. | 502/68 |

Primary Examiner—Shrive Beck
Assistant Examiner—Timothy H. Meeks
Attorney, Agent, or Firm—Inez L. Moselle

[57] ABSTRACT

This invention relates to microspheres produced by spray drying clay slurries and calcining the product to form attrition resistant microspheres. Phosphoric acid is injected in a neutral to mildly alkaline dispersed high solids kaolin slurry immediately before spray drying to improve properties of the microspheres.

7 Claims, No Drawings

PHOSPHORUS BOUND POROUS MICROSPHERES

FIELD OF THE INVENTION

This invention relates to microspheres produced by spray drying clay slurries and calcining the product to form attrition-resistant microspheres. More particularly, this invention relates to the addition of phosphoric acid with the clay in a novel manner, i.e., injecting the acid into a dispersed kaolin slurry immediately before spray drying to improve properties of the microspheres.

BACKGROUND OF THE INVENTION

It is well known that kaolin clay can be formed into particles, alone or with other ingredients such as particles of zeolitic molecular sieve, to form coherent bodies such as microspheres which, when calcined, are further hardened. For example, essentially catalytically inert microspheres adapted to be used in a selective vaporization process or to be blended with active zeolite particles are produced by spray drying a slurry of hydrous (uncalcined) kaolin clay arid calcining the resulting microspheres. See U.S. Pat. No. 4,781,818, Reagan, et al. Microspheres consisting of calcined clay and impregnated with precious metal have been commercially used to promote CO combustion in fluid catalytic cracking units. See U.S. Pat. No. 4,171,286, Dight, et al. In some cases, the promoter particles are preblended with particles containing an active cracking catalyst component (usually zeolite Y). In other applications, the promoter particles are introduced at a suitable level into the regenerator of an FCC unit, separately from the particles of cracking catalyst. Still another use of microspheres composed of calcined kaolin clay is as a reactant with caustic or sodium silicate solution to form zeolitic cracking catalyst by so-called in-situ routes. See, for example, U.S. Pat. No. 4,493,902, Brown, et al. Many cracking catalysts are prepared by mixing a slurry of previously formed crystals of zeolite Y in appropriate ion-exchange form with silica sol or silica alumina sol and kaolin followed by spray drying. Spray dried microspheres of calcined clay may also be used as a fluidization additive in FCC units.

In carrying out various processes in which an aqueous slurry of kaolin clay is spray dried, it is conventional to disperse the kaolin in the slurry prior to spray drying in order to permit the formation of high solids slurries that are sufficiently fluid to be spray dried. High solids are preferred for economic reasons. Also, higher solids are conducive to the formation of more strongly bonded particles. To disperse kaolin in water, conventional anionic clay dispersants such as sodium condensed phosphate salts, sodium silicates, soda ash, sodium polyacrylate and mixtures thereof are used. Typically, the pH of concentrated dispersed slurries of kaolin are mildly alkaline to neutral, e.g., 6.0 to 8.0, with pH 7 being optimum.

In many catalytic processes, such as FCC processes, the particles must be attrition-resistant as well as sufficiently porous. Generally, one of these qualities is achieved at the expense of the other. For example, as a particle of given chemical composition is formulated to be highly porous, the hardness usually decreases.

U.S. Pat. No. 5,190,902, Demmel, utilizes the addition of phosphoric acid (or other phosphate compounds) with kaolin clay in a spray drying process to produce spray dried microspheres which are then calcined. In some formulation zeolite particles are present in the spray dryer feed. The process is carried out in one of two basic ways. In one, the slurry of clay particles is brought to a low pH, e.g., 1.0 to 3.0 before being mixed with a source of phosphorus, followed by spray drying. In the other, the clay slurry is brought to a high pH level (e.g., 14.0 to 10.0) before mixing with phosphate-containing compound. According to the teachings of this patent, use of these pH ranges is necessary for the production of particles with superior attrition resistance. A significant problem with these prior art approaches to producing calcined clay microspheres is that neither pH range is the mildly alkaline to neutral pH range at which concentrated slurries of kaolin are fluid and amenable to commercial spray drying using high solids slurries. Thus, patentee diluted his original 70% solids slurry to 40% before pH adjustment apparently because of viscosity increases which follow formation of the aluminum phosphate binder.

Similarly, U.S. Pat. No. 5,231,064, and U.S. Pat. No. 5,348,643, both Absil, et al, describe formation of a cracking catalyst by spray drying a slurry of zeolite with a slurry of clay treated with a phosphorus source at a pH less than 3. Sufficient water is added to bring the combined slurries to a low solids content of ca. 25%.

The use of aluminum phosphates as a binder and hardening agent is well known in the ceramics industry (F. J. Gonzalez and J. W. Halloran Ceram. Bull 59(7), 727 (1980)). This usually involves addition of alumina to the ceramic mix, followed by treatment with phosphoric acid, curing and firing. Similarly, the hardening of aluminous masses such as those composed of bauxite or kaolin clay by incorporation of phosphoric acid followed by heat treatment also is known. The product of this treatment is apparently an aluminum phosphate which can act as a binder. An aluminum phosphate formed by interaction of phosphoric acid solution with an aluminum salt solution has been used to bind zeolite and clay in a cracking catalyst composition (U.S. Pat. No. 5,194,412).

SUMMARY OF THE INVENTION

We have made improved porous microspheres based on spray dried and calcined kaolin clay. The phosphoric acid and clay are pumped in separate streams to a static mixer that is adjacent to the atomizer of a spray dryer. The phosphoric acid is injected into a dispersed high solids clay slurry and the slurry is virtually instantaneously atomized into droplets in a spray dryer. The term "virtually instantaneously" as used herein refers to a time less than about 20 seconds, preferably less than about 10 seconds. This spray drying technique eliminates undesirable clay flocculation and agglomeration prior to the spray drier.

Clay flocculation and agglomeration prior to the spray drier would result in relatively large clay particle aggregates in the spray drier feed. The presence of these large aggregates cause poor and uneven packing of clay particles in the microspheres resulting from the spray drying process. Poor and uneven packing of clay particles in microspheres leads to insufficient interparticle binding of clay particles within the microspheres. This results in poor physical properties including poor attrition resistance.

In contrast, this invention gives microspheres which have good clay interparticle binding and excellent physical and chemical properties. For example, microspheres produced by the process of this invention have high attrition resistance. In addition, these microspheres retain higher porosity than microspheres from the same clay that are spray dried without phosphoric acid binder and are calcined to the same temperature. This porosity increase coupled with higher attrition resistance is surprising since, generally, an increase in porosity leads to a decrease in attrition resistance. Sufficient porosity is also important because the physical properties of the microspheres should be comparable to those of microspheres containing the active zeolitic catalytic component, i.e., very low or very high densities are undesirable.

In principle the physical properties of the microspheres can be adjusted to fit the intended application by choice of calcination conditions, clay particle size and phosphorus binder level.

Microspheres prepared by using principles of this invention have several applications in FCC including: catalytically inert microspheres having a high attrition resistance; active cracking component (by adding zeolite to the clay slurry); microspheres (with or without added components such as MgO) that preferentially react with contaminant vanadium; microspheres for in-situ zeolite growth (see, for example, U.S. Pat. No. 4,493,902, Brown et al); fluidization additive and catalytic support for a carbon monoxide combustion additive.

PREFERRED EMBODIMENTS

FCC catalysts are often blends of microspheres containing a catalytically active component (microspheres containing zeolite Y) and inerts (microspheres composed of highly calcined kaolin with low surface area and no zeolite). During the process of fluid cracking, the catalyst components attrit forming fines. While formation of fines generally is considered undesirable, formation of particles <2.6 microns (microfines) is considered particularly undesirable as these can lead to operational problems in some FCC units while fines <2 microns can be important contributors to stack opacity problems.

Both active and inactive catalyst particles attrit. However, microfine production from insufficiently bound inerts may be significantly (2 to 5 times) more severe than from active components.

The attrition resistance of an FCC catalyst can be assessed by a laboratory test (described hereinafter). The target value for a catalyst blend is a microfines value of 5% or less. This value is derived from the weight of fines generated in the test times the percentage of these fines less than 2.6 microns divided by the weight of the unattrited sample.

To achieve the microfines target value for representative FCC catalyst blends on a consistent basis it is desirable to reduce the microfines value for the inert to less than 5% while maintaining acceptable physical and chemical properties. Microfines values for highly calcined microspheres of unbound clay (U.S. Pat. No. 4,781,818) vary considerably (4–30%) with typical values being in the 10–20% range.

In the practice of this invention, the solids of clay slurry should be kept above 50% (wt.) to insure that the process is economical. Also low solids drying results in an increase in porosity which can impair attrition resistance of the final product. Any dispersant can be used provided the clay is fluid (pumpable). Mixtures of soda ash and sodium polyacrylate in various ratios, e.g., 20:80 to 80:20 (weight basis) are preferred. Viscosity is not a factor. Acid is preferably added as a concentrated solution; thus, minimal dilution of the dispersed kaolin slurry takes place when acid is injected. Thus, the phosphoric acid concentration can be from 5 to 80% by weight; 50 to 80% concentrations are preferred. The amount of P added can vary widely depending on the particle size of the clay and the hardness that is desired. For cost reasons, it is generally preferred to minimize the phosphoric acid content consistent with the desired physical and chemical properties. Satisfactory results have been attained using sufficient phosphoric acid to produce products analyzing 3–8% $P_2O_5$, expressed on a volatile free weight basis.

Calcination can be carried out in a standard laboratory high temperature oven. Alternatively, the calcination can be carried out on a large scale in a rotary kiln or other commercial scale calciner.

The temperature to which the material is calcined depends on the desired levels of attrition resistance and porosity which, in turn, will depend on the intended end use, the particle size of the clay and the % phosphate binder employed. For example, if the intended use is an attrition resistant inert catalyst blending component and the clay is a fine clay (95% <2 microns) and the binder level is ca. 7% (as $P_2O_5$), a calcination temperature of at least about 1800° F. is required. For a coarser clay (80% <2 microns) and the same level of binder, a temperature of ca. 2100° F. is required to achieve the same level of attrition resistance. On the other hand, if the spray dried material is to be used as a base for in-situ zeolite growth, calcination to 1500° F. is sufficient. Overall, a temperature range from about 1200°–2200° F. is appropriate with a range of 1500°–2100° F. preferred. Time at temperature is important only insofar as sufficient time must be provided for the entire mass being calcined to reach the desired calcination temperature. Thus, adequate heating can be accomplished in relatively short times provided samples are small. Conversely, if the temperature selected is too low, extending the calcination time has no beneficial effect.

Clay particle size distribution is an important consideration in the preparation of suitable microspheres. If the clay particle size is too large compared to the microsphere diameter, then clay particle packing within the microspheres will be non-uniform and interparticle binding among clay particles will be insufficient to achieve the desired physical properties such as attrition resistance. Using a clay consisting predominantly of fine particles will give more uniform packing of clay particles within the microsphere and better opportunity for interparticle binding. The types of clay used in the examples are listed below along with a conventional measure of fineness, the wt % <2 microns.

| Trade Name | Wt % <2 microns |
| --- | --- |
| ASP ® 600 | 80 |
| ASP ® 400 | 35 |
| ASP ® 072 | 98 |
| AMS ™ | 95 |
| ULTRAGLOSS ®-90 | 98 |

In the illustrative examples which follow, the dispersant was a mixture of soda ash and sodium polyacrylate, used in amount of about 5 lb/ton.

Microfines measurements were performed using the standard test described in U.S. Pat. No. 5,083,814 modified as follows:

1. Scope

The extended Roller Attrition Test is a modified separation test for finely divided fluid cracking catalyst. A single point (4 hour) test is run for each sample and the % fines formed determined. The % of fines less than 2.6 microns is then determined on an FRA microtrac.

2. Test Preparation for Samples 2.1 Extraction thimbles do not need any pretreatment.

2.2 Dry the sample for 2 hours in a muffle oven set at 1100° F. in covered crucibles. Cool on table top to room temperature.

2.3 Pour muffled sample into an uncovered shallow dish or pan and place it in the humidification desiccator for a minimum of 12 hours.

3. Test Run Procedure 3.1 Turn on air supply to system.

3.2 Weigh an extraction thimble and connect it to the gooseneck tube. Connect the gooseneck tube to the top of the settling chamber and secure it with masking tape.

3.3 Weigh a 7.00 gm sample from the humidification desiccator on an aluminum weighing dish and place in the t-tube. Weigh and record sample and t-tube.

3.4 Connect the t-tube to the bottom of the settling chamber. Connect the air supply lines to the t-tube and the vibrator.

3.5 Simultaneously start the airflows to the t-tube and vibrator and start your stopwatch. Set air flow rates to the proper settings after 1 minute.

3.6 Run for exactly 4 hours and stop air flow to the t-tube. Let vibrator run for 1 minute and stop air flow to vibrator.

3.7 Disconnect air supply and take the t-tube off chamber bottom. Weigh and record the sample and t-tube. Discard the sample.

3.8 Remove gooseneck tube and thimble: from settling chamber. Tap on the gooseneck tube to loosen fines so they fall into the thimble. Place thimble under the settling chamber and tap it lightly to dislodge the fines so they fall into the thimble. Weigh and record the thimble.

3.9 Tap the sides of the thimble to loosen sample fines. Pour fines into a 7 dram vial and label.

3.10 Clean the settling chamber, t-tube and gooseneck tube with air.

3.11 Submit the sample fines for FRA Microtrac. Determine <2.6 microns.

4. Calculations

Extended Attrition Test results are based on the amount of <2.6 micron material generated after attrition testing.

$$\% \text{ microfines } (MF) = \frac{\text{wt. fines} \times \% <2.6 \text{ microns}}{\text{wt. sample}}$$

In the following illustrative examples, the invention was practiced using a ¾", 12 flight, 304 stainless Chemineer KMS-12 inline static mixer to mix a concentrated phosphoric acid solution (75% activity from Worth Chemical Company) into the following: a 51% solids dispersed slurry of AMS kaolin, a gray Georgia kaolin clay; a 51.8% solids dispersed slurry of ULTRAGLOSS®90 hydrous kaolin; and 51.8% slurries of ASP grades of hydrous kaolin, supplied by Engelhard Corporation. The mixer is described by the supplier as "a radial mixer having characteristics approaching a plug flow device . . . a minimal amount of backmixing is achieved". All kaolin slurries were dispersed with "SAC" dispersant (approximately 5 lb/ton) prior to injection. "SAC" is a mixture of sodium carbonate and sodium polyacrylate. The pH of all slurries was in the range of 6–7.5. The pump rates used to introduce kaolin slurry and phosphoric acid were chosen to maintain a total flow rate of 0.52 GPM; this flow rate insures adequate mixing of the acid into the clay slurry and that the appropriate ratio of acid and clay were obtained to produce appropriate kaolin/$P_2O_5$—ratios in the inline mixer. These ratios (on a VF weight basis) ranged from 8.25 to 93% kaolin/1.75 to 7% $P_2O_5$. In all cases the resulting slurries were instantaneously (approximately 6 second residence time in mixer) injected into the atomizer of a Niro pilot co-current spray dryer whose RPM was set at 10,500 to insure the correct particle size distribution of the product. Solids in the drier were maintained at 52% for all samples.

In some examples, spray dried beads were fed into a rotary Harper Electric Furnace whose bed was set at a desired temperature. Tilt on the furnace was set at 4 inches with a 2 RPM rotation speed. These settings insured a 30 minute residence time in the furnace which produced the desired physical properties. Product rates from this 6 inch diameter horizontal calciner was approximately 20lb/hr.

EXAMPLE 1.

Microspheres were prepared from AMS kaolin clay and phosphoric acid using the Chemineer inline static mixer, spray drying and calcination procedures according to the procedure described above. The resulting microspheres contained 3.7 wt % P as $P_2O_5$. After rotary calcination at 2048° F. the microspheres had the properties in the left hand column of Table 1. For comparison, properties of microspheres of calcined kaolin prepared from AMS without phosphorus binder are also listed. Clearly the phosphorus bound microspheres had lower microfines with slightly higher Hg porosity.

TABLE 1

| Effect of Phosphoric Acid on Properties of Microspheres | | |
|---|---|---|
| Clay | AMS | AMS |
| Wt % $P_2O_5$ | 3.7 | 0 |
| Average Bulk Density (g/ml) | 0.93 | 0.92 |
| Compacted Bulk Density (g/ml) | 1.07 | 1.17 |
| Average Particle Size (microns) | 55 | 66 |
| Hg Pore Volume (cc/g) | 0.193 | 0.18 |
| $N_2$ Pore Volume (cc/g) | 0.09 | 0.09 |
| BET Surface Area (m²/g) | 6.4 | 8 |
| EAI Attrition Value (%/sec) | 0.43 | 0.44 |
| Roller Attrition Value | 1.0 | 3.4 |
| Microfines (%) | 2.1 | 10.2 |

The data of Table 1 indicate that microspheres prepared using this invention have physical properties comparable to an inert that is used successfully in fluid catalytic cracking while showing a very significant increase in attrition resistance compared to the standard inert.

EXAMPLE 2.

This example illustrates the effect of clay particle size on binding, assuming that microfines measurement is a reasonable measure of clay interparticle binding. Microspheres were prepared from various clays with nominally a 7 wt % P as $P_2O_5$ binder level. All the microsphere samples were then calcined at 2100° F. for 2 hours in a static laboratory furnace. The microfines from the calcined materials are listed in Table 2. These data indicate that at the 7% $P_2O_5$ binder level, the clay must be sufficiently fine to achieve the microfines target level.

TABLE 2

Effect of Clay Particle Size on Binding

| Clay | Microfines (%) |
|---|---|
| ASP 400 | >20 |
| ASP 600 | 2.1 |
| ASP 072 | 0.59 |
| ULTRAGLOSS 90 | 1.4 |

EXAMPLE 3.

This example illustrates the effect of binder level microfines.

Microspheres were prepared from ASP 600 and ULTRA-GLOSS-90 kaolin clays with various binder levels. All materials were calcined at 2100° F. for 2 hours in a laboratory furnace. Results for microfines are contained in Table 3.

TABLE 3

Effect of Variation of P Level on Microfines

| Clay | Microfines (%) | | |
|---|---|---|---|
| Wt % P$_2$O$_5$ | 7 | 3.5 | 1.75 |
| ASP 600 Kaolin | 2.1 | >20 | >20 |
| ULTRAGLOSS 90 Kaolin | 1.6 | 0.6 | |

Data in Table 3 show that the effect of binder level is dependent on the clay particle size. Apparently there is a threshold level of binder, above which additional binder has little or no effect. This threshold level is lower for finer clays than for relatively coarse clays. For fine clays such as ULTRAGLOSS 90, AMS and ASP 072, this threshold level is evidently below 3.5%.

EXAMPLE 4.

This example illustrates the effect of calcination temperature on microspheres prepared from AMS clay and phosphoric acid binder. Three levels of binder were investigated at three rotary calcination bed temperatures. The results are summarized in Table 4.

TABLE 4

Effect of Calcination Temperature on Microfine Content

| Calcination Temperature (degrees F.) | Wt % P$_2$O$_5$ | | |
|---|---|---|---|
| | 3.4 | 4.5 | 5.5 |
| | % Microfines | | |
| 2200 | 1.0 | 0.9 | 0.8 |
| 2000 | 2.1 | 2.9 | 2.1 |
| 1800 | 5.5 | 3.4 | 4.3 |

These data show that the amount of binder (wt % P as P$_2$O$_5$) had little effect on micofines (%MF); apparently all the binder levels were above the threshold level for a fine clay. Higher calcination temperature reduces microfines and apparently increases interparticle binding.

In another embodiment of the invention, microspheres useful as an additive for FCC operations are manufactured by mixing dispersed slurries of ZSM-5 zeolite and kaolin and injecting phosphoric acid into a slurry of the zeolite and kaolin blend that is immediately pumped into a spray dryer. The resulting microspheres are then calcined. The calcined microspheres constitute an improved octane/olefin additive that is co-circulated with microspheres of a conventional active cracking catalyst (comprising a catalytically active molecular sieve, usually zeolite Y) and an inorganic matrix. By limiting the contact time between the phosphoric acid and ZSM-5/clay blend prior to spray drying, better binding is achieved, giving the desired hardness at lower calcination temperature and not causing blocking of the access to the active sites of the ZSM-5 zeolite.

In a variant of this process, zeolitic molecular sieves other than ZSM-5, such as zeolite Y, are blended with kaolin binder and phosphoric acid is injected into a mixed slurry of binder and molecular sieve immediately prior to spray drying and calcination.

In another embodiment of the invention, the essentially catalytically inert microspheres obtained by injecting phosphoric acid into a dispersed slurry of kaolin prior to spray drying are used as a fluidization enhancing agent for microspheres of active cracking catalyst.

Fluidization of catalyst is clearly important in FCC operations since all of the unit operations are done in fluidized beds. In addition, transport (circulation) of the catalyst from one part of the FCC unit to another is accomplished using the fluidized form of the catalyst. The properties that are important for fluidization in FCC units are discussed in Engelhard's Catalyst Report, Vol 6, Issue 1. To favor fluidization and circulation, one should increase the fraction of catalyst particles less than 45 microns in diameter and minimize apparent bulk density and average particle diameter. This can be done cost effectively by using an inert microsphere with a relatively small particle size and/or relatively low density. Since small particles are lost more easily from the FCCU, it makes more sense to use inert because active cracking components are more expensive.

In still another embodiment of the invention, microspheres adapted for use as a precursor reactant for the production of a molecular sieve cracking catalyst by known in-situ techniques are prepared by injecting phosphoric acid into a dispersed slurry of hydrous kaolin clay or a dispersed slurry containing a mixture of hydrous and calcined kaolin clay. The slurry with injected phosphoric acid is immediately spray dried. The resulting microspheres are then calcined under conditions of time and temperature to convert the hydrous kaolin into metakaolin. These microspheres which, for example, are composed of metakaolin and fully calcined kaolin, are introduced into a solution of sodium silicate along with seeds and reacted at elevated temperature to form crystals of zeolite Y in a silica-alumina matrix. The crystallized microspheres are then ion-exchanged. See, for example, U.S. Pat. No. 4,493,902, Brown, et al. Alternatively, the kaolin in the slurry that is spray dried is all in hydrous form whereby upon calcination to convert the clay to metakaolin, all or essentially all of the clay is in metakaolin form. These microspheres are reacted in a seeded sodium silicate solution as described above.

In still another embodiment of the invention, a material capable of trapping vanadium, e.g., a source of magnesium, such as magnesium oxide or hydroxide, is included in the slurry of hydrous kaolin into which phosphoric acid is injected. Alternatively, a vanadium trap can be prepared from attrition resistant phosphoric acid bound microspheres prepared as described by impregnating the microspheres with a suitable magnesium source, such as magnesium nitrate.

We claim:

1. In a process for preparing microspheres comprising calcined kaolin clay wherein a dispersed aqueous slurry of hydrous kaolin is spray dried to form microspheres which are then calcined, the improvement comprising forming an aqueous solution of phosphoric acid, separately forming a dispersed aqueous slurry of hydrous kaolin clay wherein the kaolin content is at least 50% by weight, pumping said aqueous solution of phosphoric acid into said dispersed aqueous slurry of kaolin clay in a static mixer that is adjacent to an atomizer of a spray dryer, and pumping said aqueous slurry of kaolin clay containing said phosphoric acid solution into said spray dryer and spray drying the resulting mixture within less than 20 seconds after said solution of phosphoric acid is pumped into said slurry of clay, said slurry of kaolin clay having a pH in the range of 6 to 8 prior to addition of phosphoric acid.

2. The process of claim 1 wherein the kaolin in said slurry is solely hydrous kaolin.

3. The process of claim 1 wherein the slurry is spray dried within less than about 10 seconds after phosphoric acid is injected.

4. The process of claim 1 wherein a source of magnesium is present in said slurry of kaolin.

5. The process of claim 1 wherein calcined kaolin is present in said slurry of kaolin.

6. The process of claim 1 wherein the phosphoric acid is added as a solution of 50 to 80% concentration (wt.).

7. The process of claim 1 wherein a quantity of phosphoric acid is used which is sufficient to produce microspheres containing about 2 to 10% by weight of $P_2O_5$.

* * * * *